(12) United States Patent
Wen

(10) Patent No.: US 6,205,511 B1
(45) Date of Patent: Mar. 20, 2001

(54) SDRAM ADDRESS TRANSLATOR

(75) Inventor: Sheung-Fan Wen, Sunnyvale, CA (US)

(73) Assignee: National Semiconductor Corp., Santa Clara, CA (US)

( * ) Notice: Subject to any disclaimer, the term of this patent is extended or adjusted under 35 U.S.C. 154(b) by 0 days.

(21) Appl. No.: 09/156,984

(22) Filed: Sep. 18, 1998

(51) Int. Cl.[7] .................................................. G06F 12/00
(52) U.S. Cl. .............................. 711/5; 711/202; 711/219; 711/220
(58) Field of Search ........................ 709/104, 5; 711/105, 711/170, 171, 172, 173, 154, 157, 202, 206, 207

(56) References Cited

U.S. PATENT DOCUMENTS

| | | | |
|---|---|---|---|
| 3,840,863 | * 10/1974 | Fuqua et al. | 711/3 |
| 5,426,756 | 6/1995 | Shyi et al. | 395/425 |
| 5,555,524 | 9/1996 | Castellano | 365/221 |
| 5,630,096 | 5/1997 | Zuravleff et al. | 395/481 |
| 5,748,551 | 5/1998 | Ryan et al. | 365/230.03 |
| 5,754,764 | * 5/1998 | Davis et al. | 709/250 |
| 5,761,694 | * 8/1998 | Fahl | 711/5 |
| 5,781,200 | * 7/1998 | Lu et al. | 345/516 |
| 5,784,582 | 7/1998 | Hughes | 395/297 |
| 5,835,965 | * 11/1998 | Taylor et al. | 711/211 |
| 5,905,909 | * 5/1999 | Williams et al. | 711/206 |

* cited by examiner

Primary Examiner—Reginald G. Bragdon
Assistant Examiner—Christian P. Chace
(74) Attorney, Agent, or Firm—Stallman & Pollock LLP

(57) ABSTRACT

A buffer manager divides a memory space into a plurality of buffers. Each buffer occupies a plurality of sequential memory locations. The sequential memory locations include a start and an end address. To write data to a buffer, the buffer manager provides a start address and burst size to an address translator. The address translator converts the start address and the burst size to SDRAM memory address locations. The start and end address of each buffer is mapped to a different bank in the SDRAM memory.

27 Claims, 7 Drawing Sheets

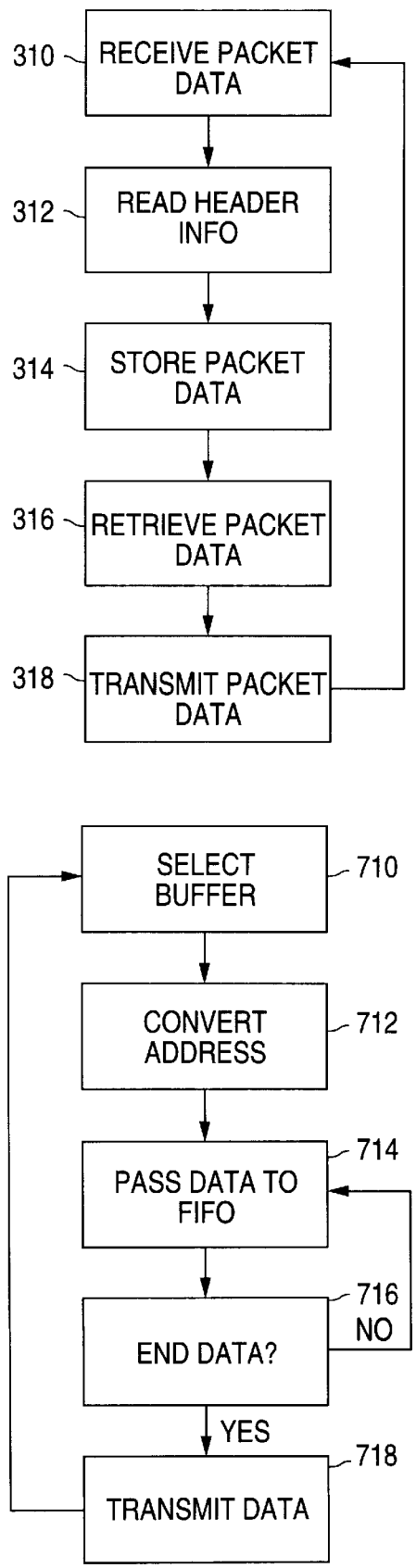
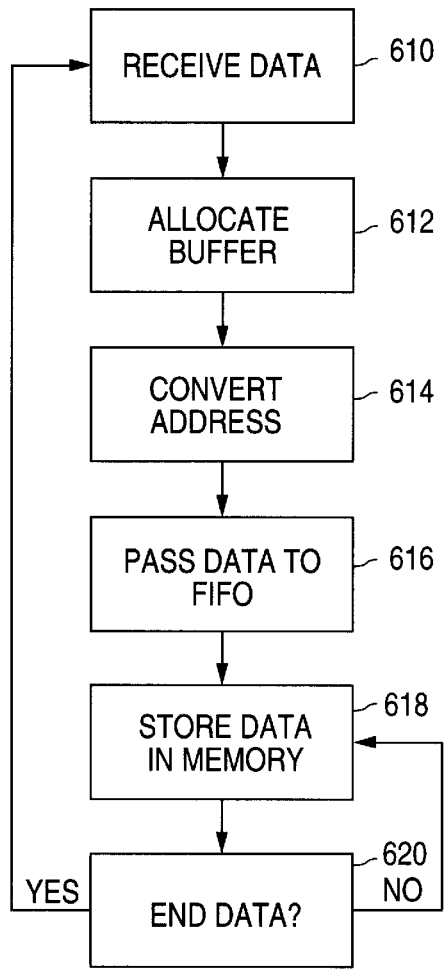
FIG. 3
FIG. 6
FIG. 7

| Relative Buffer # | Bank # [8:8] | From Flat Addr [10:0] | To Physical Addr [10:0] | Condition | Operation | Additional Operation |
|---|---|---|---|---|---|---|
| 1 | 1 | 000-0FF | 000-0FF | 0≤[10:4]<10 | no operation | |
| 2 | 2 | 150-24F | 100-1FF | 15≤[10:4]<25 | [10:8]=001 | [7:4]-5 |
| 3 | 1 | 2A0-39F | 200-2FF | 2A≤[10:4]<3A | [10:8]=010 | [7:4]+6 |
| 4 | 2 | 400-4FF | 300-3FF | 40≤[10:4]<50 | [10:8]=011 | |
| 5 | 1 | 550-64F | 400-4FF | 55≤[10:4]<65 | [10:8]=100 | [7:4]-5 |
| 6 | 2 | 6A0-79F | 500-5FF | 6A≤[10:4]<4A | [10:8]=101 | [7:4]+6 |
| | | | | | | |
| 1 | 2 | 100-14F | 700-74F | 10≤[10:4]<15 | [10:8]=111 | |
| 2 | 1 | 250-29F | 650-69F | 25≤[10:4]<2A | [10:8]=110 | |
| 3 | 2 | 3A0-3FF | 7A0-7FF | 3A≤[10:4]<40 | [10:8]=111 | |
| 4 | 1 | 500-54F | 600-64F | 50≤[10:4]<55 | [10:8]=110 | |
| 5 | 2 | 650-69F | 750-79F | 65≤[10:4]<6A | [10:8]=111 | |
| 6 | 1 | 7A0-7FF | 6A0-6FF | else | [10:8]=110 | |

SDRAM ADDRESS TRANSLATOR

FIELD OF THE INVENTION

The present invention relates generally to mapping a flat address space into an SDRAM, and in particular to mapping data buffers configured to store Ethernet packet data from a flat address space into an SDRAM address space.

BACKGROUND OF THE INVENTION

Synchronous dynamic random access memory (SDRAM) is a type of memory which is used in a wide variety of applications. An SDRAM may be divided into a plurality of banks. Each bank is further divided into a plurality of pages. In a typical SDRAM with a 48-bit wide data bus and an 8-bit wide column address, a page has 1.5 Kbytes of memory. To access a page, the SDRAM must perform pre-charge and activate operations. The pre-charge and activate operations cause some delay in accessing a memory location, however sequential accesses to the same page do not require additional pre-charge and activate operations. Nonetheless, to access a new page, the SDRAM must perform pre-charge and activate operations on the new page. These pre-charge and activate operations also cause some delay in accessing the desired memory location. To speed access to data stored in the SDRAM, data which will be accessed together should be stored on the same page. This acts to minimize the number of pre-charge and activate delays.

Since each bank includes a plurality of pages, the access of a memory location in a new page may or may not occur within the same bank. If the access of a memory location does cross a bank boundary and therefore also a page boundary, the pre-charge operation may begin before completion of the previous access. On the other hand, if the access of a memory location crosses a page boundary but does not cross a bank boundary, the pre-charge operation may not begin until after the completion of the previous access.

In some applications, the memory manager (or control process) which stores data to the SDRAM operates based upon one clock (i.e., in a first clock domain) and the SDRAM operates based upon another clock (i.e., in a second clock domain). These clocks may be asynchronous and may operate at different frequencies. When the memory manager attempts to access the SDRAM both address and data information must cross the clock domain boundary. In other words, both the address and data information must be synchronized from the first clock to the second clock. The synchronization of address and data information across the clock domain boundary delays memory access.

One application, which uses an SDRAM in a different clock domain, involves network switches which temporarily store packet data. For example, network switches are frequently used on Ethernet networks to connect multiple sub-networks. A switch receives packet data from one sub-network and passes that packet data onto another sub-network. Upon receiving a packet, a network switch may divide the packet data into a plurality of sub-packets or cells. Each of the cells includes additional header data. As is well known in the art, Ethernet packet data has a maximum size of approximately 1.5 Kbytes. With the additional header data associated with the cells, a packet of data has a maximum size of under 2 Kbytes.

After dividing the packet data into cells, the network switch may temporarily allocate a memory buffer in the SDRAM to store the packet before retransmission. The address and packet data are translated across the clock domain boundary to the SDRAM. The packet data is then stored in the memory buffer. For retransmission, the switch again accesses the SDRAM to retrieve the packet data. Both the storage and retrieval of data from the SDRAM introduce access delays.

In addition, for a 48-bit wide SDRAM with an 8-bit wide column address, the page size is 1.5 Kbytes. Accordingly, a 2-Kbyte Ethernet packet including cell headers will cross a page boundary. This introduces further access delays. On heavily-trafficked high-speed networks such delays can have a damaging effect on network performance.

Accordingly, an SDRAM is desired which may be configured as a buffer for storing Ethernet packet data. The SDRAM may operate in a clock domain different than a control process. Nonetheless, the SDRAM should operate to minimize access delays.

SUMMARY OF THE INVENTION

In one preferred embodiment, an address translation circuit for mapping address information to an SDRAM includes a buffer manager interface and a translation circuit. The buffer manager interface is configured to receive address information from a buffer manager. The buffer manager allocates a plurality of buffers each having a start address and an end address related therewith. The translation circuit is operationally coupled with the buffer manager interface. The translation circuit maps the start address of each of the plurality of buffers to a first bank and maps the related end address to a second bank, different than the first bank.

BRIEF DESCRIPTION OF THE FIGURES

FIG. 3 is a flow chart of the operation of the network switch of FIG. 1 receiving and transmitting packet data.

FIG. 6 is a flow chart of one preferred write operation using the memory control unit of FIG. 5.

FIG. 7 is a flow chart of one preferred read operation using the memory controller unit of FIG. 5.

DETAILED DESCRIPTION

Figure 1:
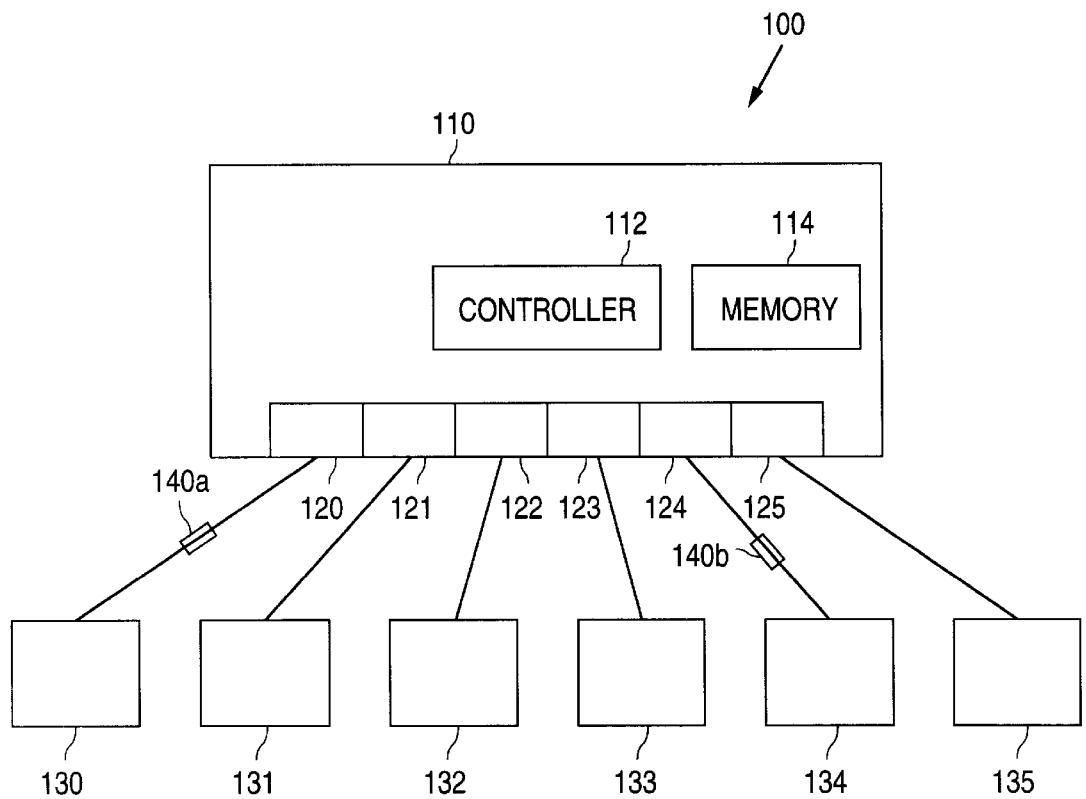
FIG. 1 is a block diagram of a network including a network switch.

Turning to FIG. 1, an Ethernet network 100 in accordance with the invention is described. The Ethernet network includes a switch 110 having a plurality of ports 120–125. The switch also includes a controller 112 and a memory 114. The controller 112 directs the flow of data between the ports 120–125. The controller 112 uses the memory 114 as temporary storage while data is being transmitted between the ports 120–125.

Each of the ports 120–125 connect to one of a plurality of sub-networks 130–135. The sub-networks may include a plurality of network devices or may include only a single network device such as a computer. The Ethernet network allows any of the sub-networks 130–135 to communicate with any other sub-network.

By way of example, sub-network 130 may communicate with sub-network 134 by sending a packet of data 140*a*. The packet of data 140*a* is received through port 120 by switch 110. Controller 112 then scans the packet of data 140*a* and saves it to the memory 114. Subsequently, controller 112 reads the packet of data 140*a* from the memory 114 and routes it to the appropriate port. As shown, the switch 110 has determined that the packet of data 140*a* should be routed to network 134 as the packet of data 140*b*. Controller 112 makes the routing decisions based upon information included in the packet of data 140*a*.

Figure 2:
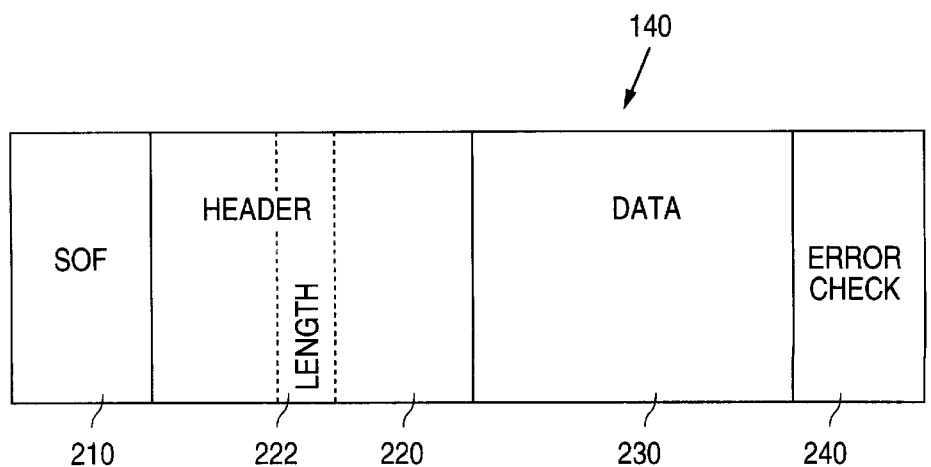
FIG. 2 is a block diagram of a packet of network data.

Turning to FIG. 2, a block diagram of a packet of data 140 is described. The packet of data 140 includes a start of frame delimiter (SOF) 210. The SOF 210 indicates the beginning of a packet of data. The packet of data 140 also includes a header 220, which includes information such as source address, destination address, and packet length 222. The packet of data 140 also includes a data field 230. This field is used to transmit information between network devices. Finally, the packet of data 140 includes an error check field 240. This field is used to determine whether the packet was corrupted during transmission over the network.

Turning to FIG. 3, a flow chart of the operation of the switch 110 of FIG. 1 is described. The switch 110 begins at step 310 where it receives a packet of data over one of its ports. At step 312, the switch 110 reads the header field to determine the packets length and destination. At step 314, the switch 110 then temporarily stores the packet in a memory buffer. At step 316, the switch 110 uses the destination information to determine the proper routing of the packet. In particular, the switch 110 determines which ports have a network device whose network ID matches the destination address of the packet. The network switch also determines whether the related network have sufficient bandwidth to transmit the packet. If so, the switch 110 reads the packet out of the memory buffer.

At step 318, the switch retransmits the packet over the port having a network device whose network ID matches that of the destination address of the packet. Multicast and broadcast packets are transmitted over multiple ports.

Figure 4:
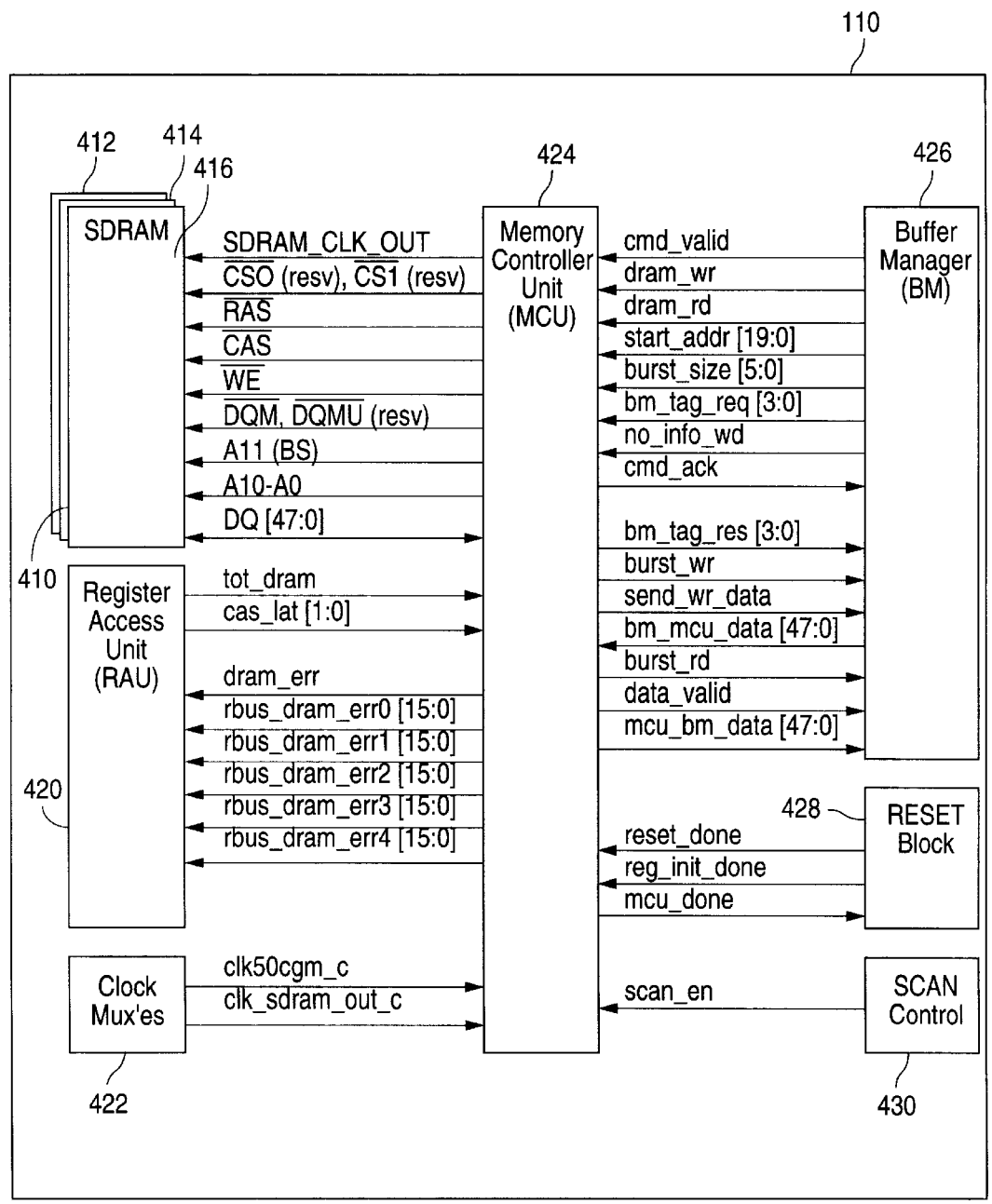
FIG. 4 is a block diagram of one preferred embodiment of the switch of FIG. 1 including an SDRAM, a memory control unit and a buffer manager.

Turning to FIG. 4, a block diagram of one preferred embodiment of the switch 110 of FIG. 1 is described. The switch 110 includes an SDRAM 410, a memory control unit 424, and buffer manager 426. The buffer manager 426 manages the flow of packet data into the SDRAM 410. More specifically, the buffer manager 426 assigns buffers to incoming packets and monitors the allocation of buffers as data is written to and read from the SDRAM 410.

The SDRAM 410 consists of three SDRAM chips 412–416, each with a 16-bit data bus (not shown). Each SDRAM chip includes two banks, $2^{11}$ rows, and $2^8$ columns. Together the SDRAM chips 412–416 provide 6 Mbytes of memory. The memory locations are accessed over a 20-bit address bus.

Packet data and address information are passed from the buffer manager 426 to the memory control unit 424. Memory control unit 424 uses the address information to save the packet data into the SDRAM 410.

Memory control unit 424 also connects to a register access unit 420, clock multiplexor 422, scan controller 430, and reset block 428. The register access unit 420 is used to store error information, which may be communicated to the switch 110. The clock multiplexor 422 provides one clock signal (clk_sdram_out_c) for the SDRAM 410 and another clock signal (clk50cgm_c) for the other clocked circuits, including buffer manager 426. These two clocks are asynchronous to one another and may operate at different frequencies. Accordingly, memory control unit 424 also operates to coordinate the transfer of packet data and address information across these two clock domains.

Reset block 428 is used to coordinate initialization of SDRAM 410 and memory control unit 424. Scan controller 430 is used for testing the memory control unit 424 in manufacturing the integrated circuit.

A brief description of the clock signals clk50cgm_c and clk_sdram_out_c is given in the following table:

| Memory Control Unit - Clock Signals | | | | |
|---|---|---|---|---|
| Signal Name | Type | Signal | Polarity | Signal Description |
| clk50cgm_c | I | Pulse | Positive Edge | 50-MHz clock |
| clk_sdram_out_c | I | Pulse | Positive Edge | 50-MHZ to 100-MHz clock |

The Type column indicates that the signals are input (I) to the memory control unit 424. The Signal column indicates that the signals are digital pulse signals (Pulse). The Polarity column indicates that the clocks trigger circuit elements on a positive transition. The Signal Description gives the acceptable range of the clock signal frequencies.

A brief description of the signals between the register access unit 420, the reset block 428, the scan controller 430 and the memory control unit 424 is given in the following table:

| Memory Control Unit - Interface Signals | | | |
|---|---|---|---|
| Signal Name | I/F | Type | Signal Description |
| reset_done | RESET | I | CGM clock has stabilized. |
| mcu_bypass (not shown) | RESET | I | Bypasses initial 200 us powerup wait on SDRAM. |
| reg_init_done | RESET | I | Registers contain valid bits. |
| cas_lat [1:0] | RAU | I | CAS latency 00: 4 01: 1 10: 2 (default) 11: 3 |
| start_post (not shown) | RAU | I | Trigger SDRAM power-on-self-test operation. |
| mcu_done | RESET | O | DRAM initialized and passed self-test; MCU is ready for normal operation. |
| dram_err | RAU | O | DRAM failed self-test; all DRAM access is disabled. |
| rbus_dram_err4 [15:0] | RAU | O | [15:7] reserved. [6:6]: post_done: asserted when post is finished. [5:4]: DRAM checker pattern. [3:0]: DRAM address (high bits). |
| rbus_dram_err3 [15:0] | RAU | O | DRAM address (low bits). |
| rbus_dram_err2 [15:0] | RAU | O | Erroneous data (high bits) |

-continued

Memory Control Unit - Interface Signals

| Signal Name | I/F | Type | Signal Description |
|---|---|---|---|
| reset_ios_enb (not shown) | RESET | I | I/O-cell-output enable allowed. |
| scan_en | SCAN | I | Enables SCAN chain shift registers. |
| rbus_dram_err1 [15:0] | RAU | O | Erroneous data (mid bits). |
| rbus_dram_err0 [15:0] | RAU | O | Erroneous data (low bits). |

The I/F column indicates the source or destination of the signal. The register access unit 420 is denoted by RAU, reset block 428 is denoted by RESET, and scan controller 430 is denoted by SCAN. The Type column indicates whether the signal is an input (I) or an output (O) signal as seen by the memory control unit 424. The Signal Description column provides a brief description of the signal.

A brief description of the signals between the SDRAM 410 and the memory control unit 424 is given in the following table:

Memory Control Unit - SDRAM Signals

| SIGNAL NAME | I/F | TYPE | SIGNAL DESCRIPTION |
|---|---|---|---|
| RAS | SDRAM | O | Row-address strobe, sampled at rising edge of CLK Defines SDRAM operation. |
| CAS | SDRAM | O | Column-address strobe, sampled at rising edge of CLK. Defines SDRAM operation. |
| WE | SDRAM | O | Write enable, sampled at rising edge of CLK. Defines SDRAM operation. |
| DQM | SDRAM | O | DOM high places SDRAM DQ buffers in high-Z state; disables read from SDRAM operation and blocks write to SDRAM operation. DQM low enables such read and write operations. |
| A11 (BS) | SDRAM | O | BS low selects bank A; BS high selects bank B. |
| A10-A0 | SDRAM | O | Address selection signals within bank A and bank B. |
| DQ [47:0] | SDRAM | I/O | Data from SDRAM |

The I/F column indicates the source or destination of the signal. The SDRAM 410 is denoted SDRAM. The Type column indicates whether the signal is an input (I) or an output (O) signal as seen by the memory control unit 424. The Signal Description column provides a brief description of the signal.

In addition to the above table, the clk_sdram_out_c signal is routed through the memory control unit 424. The memory control unit 424 provides this signal to the SDRAM 410 as SDRAM_CLOCK_OUT.

During a Bank-Active command cycle, A0–A10 defines the row address (RA0–RA10) when sampled at the rising edge of SDRAM_CLK_OUT. During a read or write command cycle, A0–A7 defines the column address (CA0–CA7) when sampled at the rising edge of SDRAM_CLK_OUT. The A10 bit high enables automatic pre-charge on bank selected by A11. The A10 bit low disables automatic pre-charge. During a pre-charge command cycle, the A10 bit high enables pre-charging both banks A and B. The A10 bit low enables pre-charging selected bank by the A11 bit. In one preferred embodiment, the automatic pre-charge is not used because does not accommodate variable burst sizes.

A brief description of the signals between the buffer manager 426 and the memory control unit 424 is given in the following table:

Memory Control Unit - Buffer Manager Signals

| Signal Name | I/F | Type | Signal Description |
|---|---|---|---|
| cmd_valid | BM | I | A valid command is present on dram_wr, dram_rd. |
| start_addr [19:0] | BM | I | The address of the first word in a cell. |
| burst_size [5:0] | BM | I | Number of words in the cell. |
| no_info_wd | BM | I | Info word present if (~no_info_wd & bm_tag_req==1) is true. |
| dram_wr | BM | I | Command is a write to DRAM command. |
| dram_rd | BM | I | Command is a read from DRAM command. |
| bm_tag_req [3:0] | BM | I | A unique tag for this write/read command. |
| cmd_ack | BM | O | Read/write command and tag are acknowledged; only until then should cmd_valid, start_addr, burst_size, dram_wr, dram_rd, and BM_tag_req [3:0] be de-asserted; cmd_ack is de-asserted when burst_wr or burst_rd is asserted (or BM's SM breaks). |
| bm_tag_res [3:0] | BM | O | Tag same as BM_tag_req [3:0]; issued when burst_wr or burst_rd command is asserted. |
| burst_wr | BM | O | Asserted at the beginning of a cell-write burst, and at the same time de-asserting cmd_ack data can be sent from BM on the next clock; de-asserted on writing the word in the cell to MCU FIFO; this is an envelop signal. |
| send_wr_data | BM | O | Word data should be sent from BM on the next single clock and are latched by MCU a clock later. |
| burst_rd | BM | O | Asserted at the beginning of a cell-read burst, and at the same time dea-sserting cmd_ack, data can be sent to BM on the same clock; de-asserted one clock after reading the last word in cell from MCU FIFO; this is an envelop signal. |
| data_valid | BM | O | Word data are sent to BM on the same clock and should be latched by BM on the next clock. |
| mcu_bm_data [47:0] | BM | O | Data going from MCU to BM. |

Again, the I/F column indicates the source or destination of the signal. The buffer manager 426 is denoted BM. The Type column indicates whether the signal is an input (I) or an output (O) signal as seen by the memory control unit 424. The Signal Description column provides a brief description of the signal.

Figure 5:
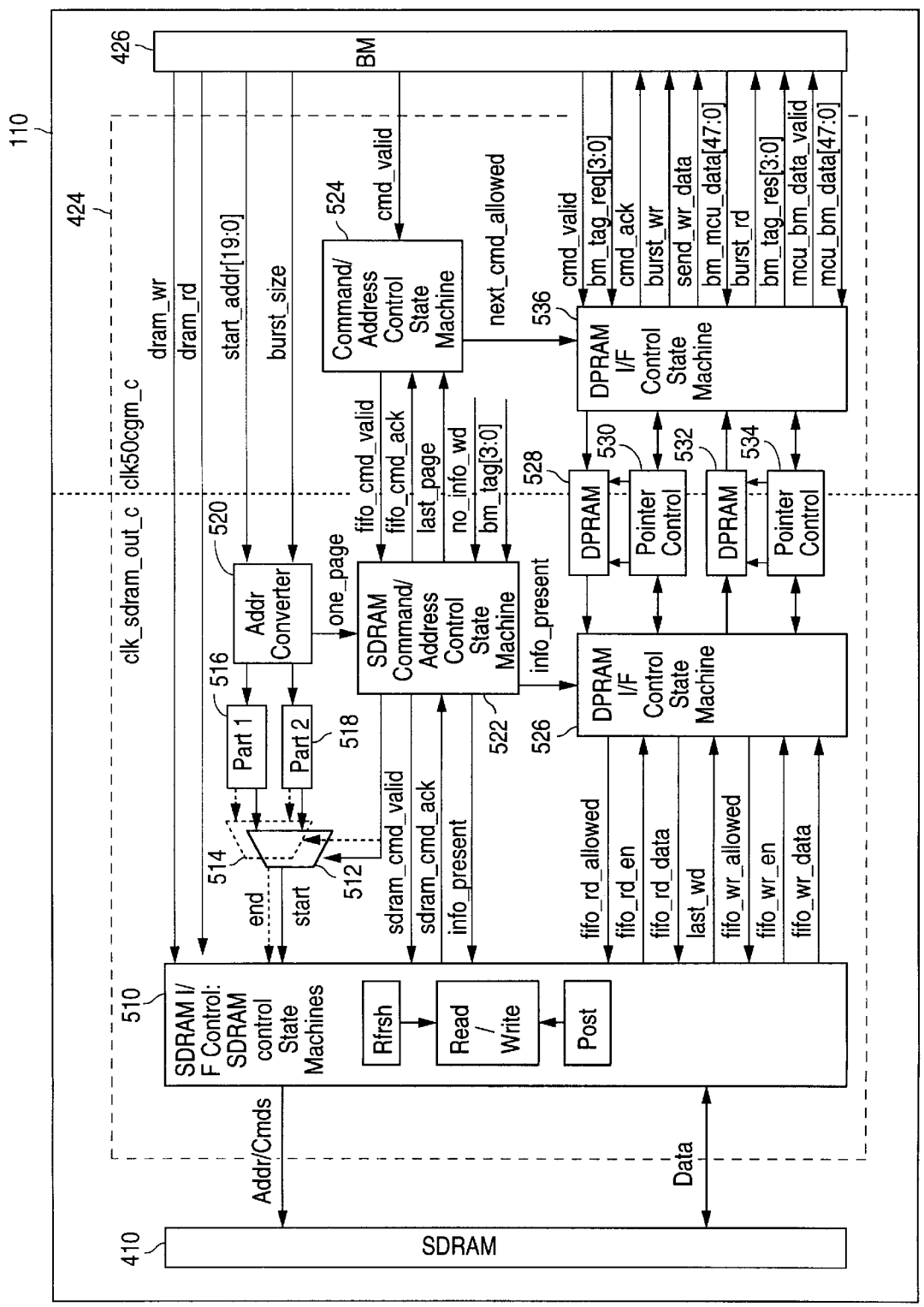
FIG. 5 is a block diagram of the switch of FIG. 4, including further detail of one preferred embodiment of the memory control unit.

Turning to FIG. 5, a block diagram of switch 110, including further detail of one preferred embodiment of the memory controller unit 424, is described. Memory control unit 424 is divided into two clock domains: clk_sdram_out_c and clk50cgm_c. Signals in the clk_sdram_out_c domain are valid following a positive transition in this clock signal. Signals in the clk50cgm_c domain are valid following a positive transition in this clock signal.

Memory control unit 424 includes an SDRAM interface controller 510, an SDRAM command controller 522, and a buffer manager command controller 524. The SDRAM command controller 522 receives command information from the buffer manager 426 through the buffer manager command controller 524. Since the SDRAM command controller 522 and the buffer manager 426 operate in different clock domains, the buffer manager command controller 524 operates to coordinate the transfer of command information across the clock domains. In response to commands from the buffer manager 426, the SDRAM controller 522 provides control signals to the SDRAM interface controller 510. In addition to these signals, the SDRAM interface controller 510 receives signals directly from the buffer manager 426, multiplexors 512 and 514, and DPRAM controller 526. In response to these signals, the SDRAM interface 510 reads and writes data to the SDRAM 410.

More specifically, the SDRAM controller 510 receives start and end address signals from multiplexors 512 and 514. These address signals are used to select a starting and ending address location within the SDRAM 410 and are based upon signals received from buffer manager 426. Specifically, the buffer manager provides a start address and a packet size to address converter 520. In response to these signals, the address converter 520 selects start and end address locations within SDRAM 410. The selected addresses are saved in registers 516 and 518. The address conversion is described in further detail below. The registers 516 and 518 in turn provide the address information to multiplexors 512 and 514. Multiplexor 512 provides the start address to SDRAM controller 510; Multiplexor 514 provides the end address information to SDRAM controller 510.

Although the address conversion has been described with reference to specific circuit elements, the same functionality may be implemented using other configurations. For example, the same functionality may be implemented in software.

The SDRAM controller 510 reads and writes data to the SDRAM 410. This data is provided to and received from the buffer manager 426 through a synchronization circuit. The synchronization circuit includes DPRAM controllers 526 and 536, DPRAMs 528 and 532, and pointer controllers 530 and 534. The synchronization operates to translate data across the clk_sdram_out_c to clk50cgm_c clock boundary.

More specifically, DPRAM 528 acts as a FIFO. Packet data received by DPRAM controller 536 is written to DPRAM 528 and this packet data is subsequently read out of DPRAM 528 by DPRAM controller 526. The write and read operations are coordinated by pointer controller 530. Pointer controller 530 monitors DPRAM 528 so that unread elements are not overwritten and so that the oldest packet data is read first. The DPRAM controllers 536 and 526 each maintain a pointer to the DPRAM 528 to write and read data to the FIFO. The pointer controller 528 coordinates these pointers across the clock domains.

Similarly, DPRAM 532 acts as a FIFO, except that packet data received by DPRAM controller 526 is written to DPRAM 532 and this packet data is subsequently read out of DPRAM 532 by DPRAM controller 536.

A dual port FIFO with synchronized read and write pointers is described in further detail in copending application Ser. No. 09/156,516, titled "DUAL PORT FIFO WITH SYNCHRONIZED READ AND WRITE POINTERS", filed Sep. 17, 1998 and is incorporated herein by reference.

Turning to FIG. 6, a flow chart of one preferred write operation using the memory controller unit of FIG. 5 is described. Beginning at step 610, the buffer manager 426 receives a packet of data. At step 612, the buffer manager 426 allocates a buffer in the SDRAM 410. Buffer manager 426 passes both a starting address and a burst size to memory control unit 424. As mentioned above, packet data may be divided into cells. Accordingly, the burst length is used to indicate the length of the cell. By dividing packet data into cells, data may be written to the SDRAM 410 before an entire packet has been received.

At step 614, the memory control unit 424 provides the starting address and burst size to address converter 520. The address converter 520 converts the start address from a flat memory address space to an SDRAM memory space. This conversion is described further below. The address converter 520 also determines an end address by adding the burst size to the start address.

At step 616, the memory control unit 424 receives data from the buffer manager 426. This data is translated across the clock domains simultaneously with the address conversion. In particular, the data is pushed onto a FIFO stack and the FIFO pointers are synchronized across the clock domains. This allows the data to be popped from the FIFO stack in the other clock domain.

At step 618, the address has been translated and the data has been synchronized to the SDRAM's clock. Accordingly, the memory control unit 424 writes the synchronized data to the SDRAM 410. At step 620, the memory control unit 424 determines whether the last data word has been written to SDRAM 410. The SDRAM 410 writes data to sequential memory locations. When the SDRAM reaches the end address, as calculated at step 614, the SDRAM returns to step 610 to wait for additional packet data.

Turning to FIG. 7, a flow chart of one preferred read operation using the memory control unit of FIG. 5 is described. Beginning at step 710, the buffer manager 426 selects a buffer which contains packet data and passes both a starting address and a burst size to memory control unit 424. At step 712, the memory control unit 424 provides the starting address and burst size to address converter 520. The address converter 520 converts the start address from a flat memory address space to an SDRAM memory space. This conversion is described further below. The address converter 520 also determines an end address based upon the start address and the burst size.

At step 714, the memory control unit 424 passes the start and end address to SDRAM 410. In turn, SDRAM 410 begins reading data from sequential addresses beginning at the start address. This data is translated across the clock domains simultaneously with the address conversion. In particular, the data is pushed onto a FIFO stack and the FIFO pointers are synchronized across the clock domains. This allows the data to be popped from the FIFO stack in the other clock domain.

At step 716, the SDRAM determines whether the end address has been reached. If not, the SDRAM 410 returns to step 714 to read data from the next sequential address. Otherwise, the data read is complete.

Accordingly, at step 718, the buffer manager transmits the packet data to the appropriate network device and returns to step 710 to select the next buffer.

Figures 8, 10:
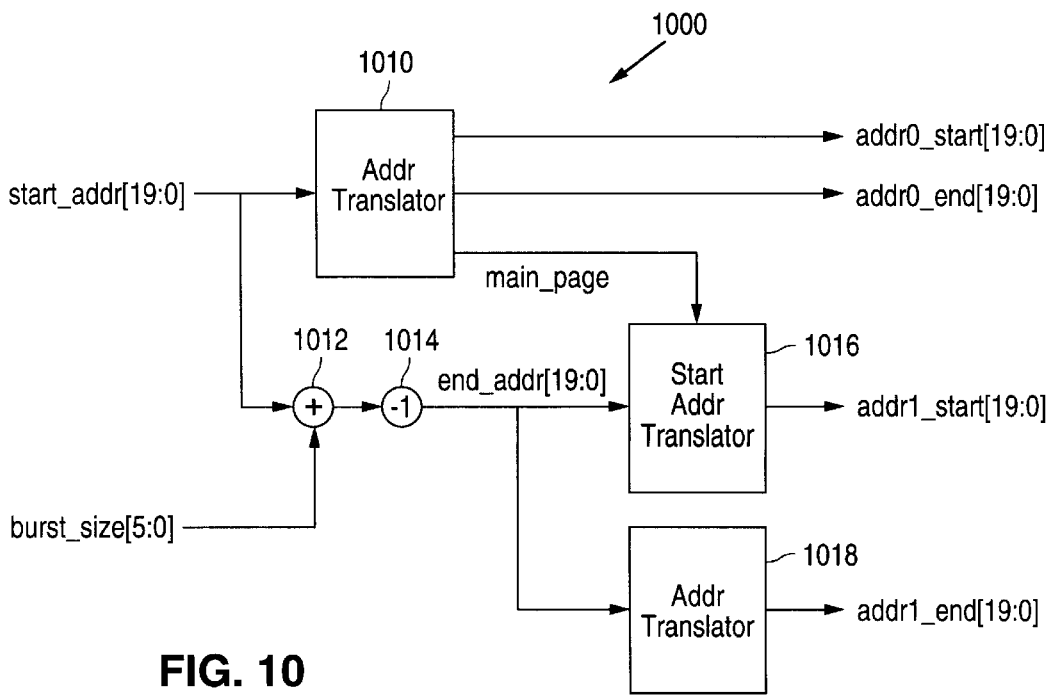
FIG. 8 is a table of one preferred address translation from a flat memory address space to an SDRAM address space.
FIG. 10 is a block diagram of one preferred embodiment of an SDRAM memory address selection circuit.

FIG. 8 is a table of one preferred address translation from a flat memory address space to an SDRAM address space. This address translation is performed by address converter 520 of FIG. 5. The flat memory address space is divided into six buffers (1–6) as indicated in the Relative Buffer # column. Each of the buffers is allocated a range of memory location within the flat memory address space. This allocation is indicated by the From Flat Addr column. For example, buffer 1 is allocated flat memory address space 000-14F (listed as 000-0FF and 100-14F) in hexadecimal notation. The other buffers are similarly allocated memory in the flat memory address space.

Since each of the buffers is larger than one page, each of the buffers are mapped into two banks. For example, a portion of buffer #1 is mapped into bank 1 and a portion of buffer #1 is mapped into bank 2. More specifically, flat memory locations 000-0FF are mapped to bank #1 and flat memory locations 100-14F are mapped to bank #2. The physical memory locations within the banks are indicated by the To Physical Addr column.

The Condition column indicates the mapping condition. For example, the first entry, "0<=[10:4]<10" indicates that if the value of address bits ten through four are greater than or equal to 0 and less than 10, then the address locations will be mapped to physical address locations in the range of 000-0FF in Bank 1. Since the flat memory address locations match the physical memory address locations, no operation need be performed on these addresses.

For the second entry, if the tenth through fourth bits satisfy the condition 15<=[10:4]<25, then the second physical address range is selected. Accordingly, the flat memory address locations 150-24F are mapped to the physical memory address locations 100-1FF. This translation is performed according to both the Operation column and the Additional Operation column. Specifically, the Operation column indicates that the tenth through eighth bits ("[10:8]") are mapped to 001 in binary notation. The Additional Operation indicates that the seventh through fourth bits ("[7:4]") are reduced by 5. These two operations are applied to each flat memory address location to generate the corresponding physical memory address location.

The other entries operate in a similar manner so that each flat memory address location is mapped to a physical address memory location. The condition column is applied to the flat memory address location. If the flat memory address location falls within the selected range, then the corresponding operations from the Operation and Additional Operation column are applied to the flat memory address location. These operations generate the physical memory address location.

Figure 9:
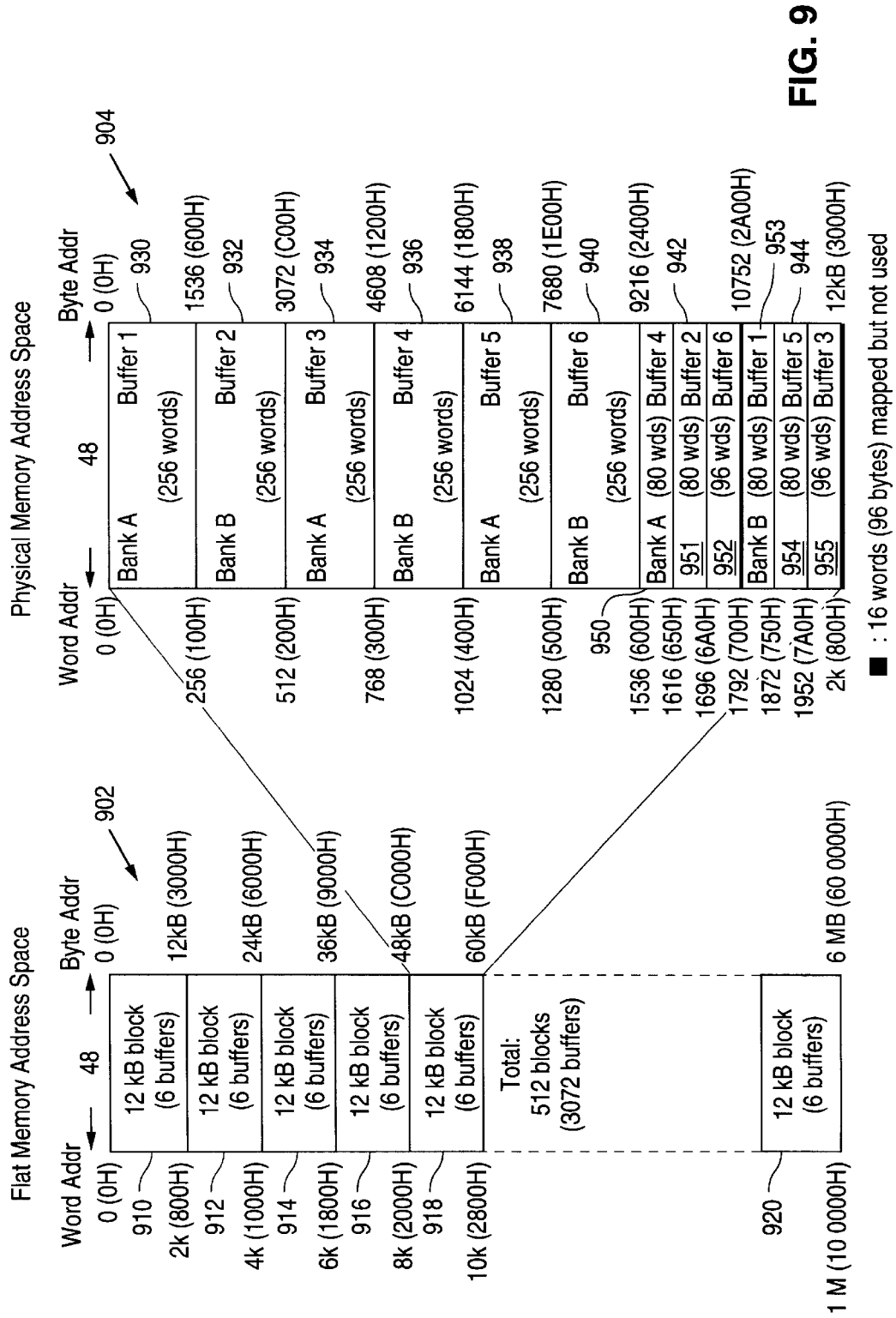
FIG. 9 is a block diagram of the address translation of FIG. 8.

Turning to FIG. 9, a block diagram of the address translation of FIG. 8 is described. The flat memory address space 902 is divided into blocks 910–920. Blocks 910–920 are each mapped to the physical memory address space by the address converter 520 (shown in FIG. 5). The mapping of memory 918 is shown in detail. The other memory blocks are similarly mapped.

In particular, block 918 is subdivided into six buffers. These buffers occupy pages 930–944 of the SDRAM 410. Pages 930, 934, 938 and 942 are in Bank A of the SDRAM 410. Pages 932, 936, 940 and 944 are in Bank B of the SDRAM 410. Page 942 is subdivided into a first portion 950, a second portion 951 and a third portion 952. Page 944 is subdivided into a first portion 953, a second portion 954 and a third portion 955.

Buffer 1 occupies page 930 and the first portion 953 of page 944. Buffer 2 occupies page 932 and the second portion 951 of page 942. Buffer 3 occupies page 934 and the third portion 955 of page 944. Buffer 4 occupies page 936 and the first portion 950 of page 942. Buffer 5 occupies page 938 and the second portion 954 of page 944. Buffer 6 occupies page 940 and the third portion 952 of page 942.

When writing packet data to a buffer, the memory control unit 424 first accesses pages 930–940. Accordingly, these pages are termed main pages. If a main page is not able to hold an entire packet, then the memory control unit 424 accesses a portion of pages 942–944. Accordingly, these pages are termed supplemental pages.

For example, the memory control unit 424 may attempt to store a 2-Kbyte packet of data into buffer 1. Data is first written to page 930, however, this page can only hold 1.5-Kbytes of data. Accordingly, the remaining packet data is written to the first portion 953 of page 944. Since page 930 is in Bank A and page 944 is in Bank B, the pre-charge operation on page 944 may begin before completion of writes to page 930.

Turning to FIG. 10, a block diagram of one preferred embodiment of an SDRAM memory address selection circuit 1000 is described. The SDRAM memory address selection circuit includes flat-to-SDRAM address translators 1010 and 1018 as well as start address translator 1016. Together, these translators receive start address and burst size information from a buffer manager and generate address start and address end signals for an SDRAM. The SDRAM memory address circuit 1000 allows the buffer manager to address the SDRAM as a flat memory. This simplifies implementation of the buffer manager.

The start address information is provided by the start_addr signal and the burst size information is provided by the burst_size signal. Adder 1012 adds the start_addr signal to the burst_size signal. The output of adder 1012 is provided to subtractor 1014, which decrements this output by one. The output of subtractor 1014 is the end address location and is provided as the end_addr signal.

The start_addr signal is also provided to flat-to-SDRAM address translator 1010. The start_addr signal is a 20-bit wide signal. The eleven least significant bits of the start_addr signal (i.e. [10:0]) are converted according to the table shown in FIG. 8. The nine most significant bits are not altered by the flat-to-SDRAM address translator 1010.

The eleven least significant bits are sufficient to map a buffer into a main page in one bank and a supplemental page in another bank. In addition, use of the nine most significant bits would require additional translation circuitry and therefore additional logic gates. This would in turn delay the address conversion.

The eleven least significant bits, which were converted according to the table shown in FIG. 8, are combined with the nine most significant bits of the start_addr signal to provide the addr0_start signal. This signal is the start address in the SDRAM.

In addition, flat-to-start address translator 1010 provides a main-page signal (main_page), and a main-page end address signal (addr0_end). The main_page signal indicates whether the translated starting address mapped to a main page. If so the main_page signal is asserted. Otherwise, the main_page signal is de-asserted. The addr0_end signal indicates the last available address location on the main page. Turning back to FIG. 9, the last available address in main page 930 is 255 (0FFh).

The start address translator 1016 receives the end_addr signal and the main_page signal. The start address translator 1016 indicates the first available address location in a supplemental page. Turning back to FIG. 9, the first available address location in supplemental page 944 for Buffer 1 1792 (700h).

For data other than packet data, reads and writes may occur from a supplemental page to a main page. For example, addr0_start may be assigned 700h. Accordingly, main_page is de-asserted, then addr1_start would then be assigned 100h (i.e. the beginning of Buffer 2).

The end_addr signal is also provided to flat-to-SDRAM address translator 1018. The end_addr signal is a 20-bit wide signal. The eleven least significant bits of the end_addr signal (i.e. [10:0]) are converted according to the table shown in FIG. 8. The nine most significant bits are not altered by the flat-to-SDRAM address translator 1018.

The eleven least significant bits, which were converted according to the table shown in FIG. 8, are combined with the nine most significant bits of the end_addr signal to provide the addr1_end signal. This signal is end address in the supplemental page of the SDRAM. Page: 27

To speed up address translations, all four addresses, namely addr0_start, addr0_end, add1_start and addr1_end, are generated simultaneously. These address signals will be used differently depending upon whether the subject cell will be contained within one page.

If a cell is contained within one page, then addr0_start points to the actual SDRAM start address, addr0_end points to the last address on the same SDRAM page, addr1_start points to the first address of the next SDRAM page in sequence, and addr1_end points to the actual end address on the same SDRAM page as addr0_start. Therefore, in this case, only addr0_start and addr1_end will be used by an SDRAM controller. Specifically, the SDRAM controller will use addr0_start as the starting address and addr1_end as the ending address. Since all data is written to one page, the SDRAM controller can ignore page boundaries.

If a cell is contained within two SDRAM pages, then addr0_start points to the actual SDRAM start address, addr0_end points to the last address on the same SDRAM page, addr1_start points to the first address of the next SDRAM page in sequence, and addr1_end points to the actual end address on the same SDRAM page as addr1_start. Therefore, in this case, all four addresses will be used by an SDRAM controller. Specifically, the SDRAM controller will first use addr0_start and addr0_end to write (or read) data to the first page. The SDRAM controller will then use addr1_start and addr1_end to write (or read) data to the second page.

Figure 11:
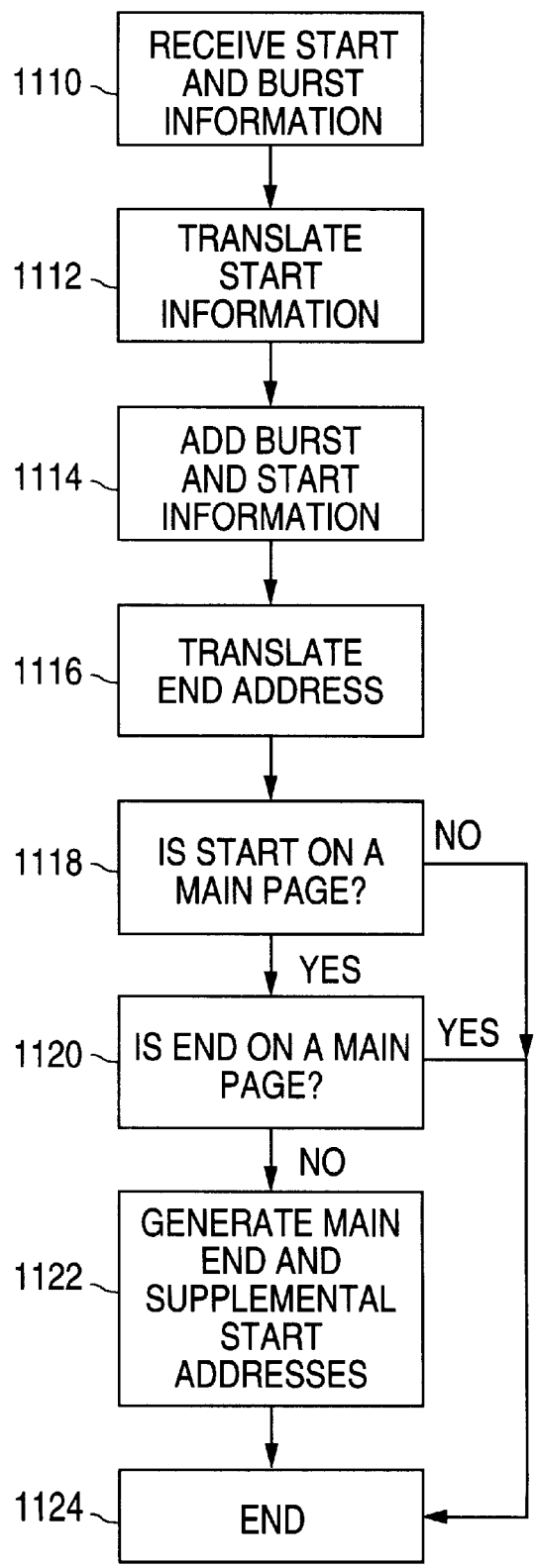
FIG. 11 is a flow chart of one preferred operation of the memory control unit of FIG. 4 translating an address from a flat memory address space to an SDRAM address space.

Turning to FIG. 11, a flow chart of one preferred operation of the memory control unit of FIG. 4 translating an address from a flat memory address space to an SDRAM address space is described. At step 1110, the memory control unit receives a flat-memory address signal and a burst size. At step 1112, the memory control unit translates the flat-memory address signal into an SDRAM address signal. The translation occurs according to the table shown in FIG. 8. At step 1114, the memory control unit adds the burst size to the flat-memory address signal to provide a flat-memory end address signal. At step 1116, the memory control unit translates the flat-memory end address signal to an SDRAM end address signal.

At step 1118, the memory control unit determines whether the SDRAM start address signal falls on a main page. If not, the translation is complete. Otherwise at step 1120, the memory control unit determines whether the SDRAM end address signal falls on a main page. If so, the translation is complete. Otherwise the data will cross a page boundary. Accordingly, at step 1122, the memory control unit generates page boundary address signals. The page boundary address signals indicate the last available address location on the main page and the first available address location on the supplemental page. The translation is then terminated.

The above-described mapping acts to speed data access. Specifically, this mapping arranges packet data, which will be accessed together but cannot be stored in the same page in different banks. This allows the pre-charge and activate operations to begin before the completion of the previous access and thereby further reduce data access time.

In addition, during normal operation, Buffer 1 will be accessed first. As shown in FIG. 9, a first portion of Buffer 1 (i.e., 930) resides in Bank A and a second portion of Buffer 1 (i.e., 950) resides in Bank B. Typically, a packet of data will not occupy an entire page of memory. Accordingly, only 930 will be accessed. Buffer 2 will be accessed next. Since the first portion of this buffer resides in Bank B (i.e., page 932), this page may be pre-charged and activated while data is still being written to Bank A. The main pages of other sequential buffers are likewise arranged in different banks. This arrangement acts to speed data access.

Although the embodiments described herein implement an address translation which receives start and length address information, the address translation may also receive start and end address information. The same translation may be applied to such address information. In addition, the address translation may generate start, length or burst size information depending upon the requirements of the SDRAM.

More specifically, as described above, start_addr and burst_size are provided by a buffer manager and are converted into addr0_start, addr0_end, addr1_start, and addr1_end in SDRAM address space. Equivalenty, start_addr and burst_size may be converted into addr0_start, addr0_size, addr1_start, and addr1_size. In other words, instead of generating the start and end addresses, it is functionally equivalent to generate the start addresses and the sizes of bursts for those start addresses.

Although the embodiments described herein are with reference to a network device, the present invention is applicable to any device which translates memory addresses from a flat memory address space. In addition, although the present invention is described with reference to particular functional blocks and tables, other designs may perform the same functionality or obtain the same advantages using different configurations. Those having ordinary skill in the art will certainly understand from the embodiments disclosed herein that many modifications are possible without departing from the teachings hereof. All such modifications are intended to be encompassed within the following claims.

I claim:

1. An address translation circuit for mapping address information to an SDRAM, comprising:
   a buffer manager interface that receives address information from a buffer manager, wherein the buffer manager allocates a plurality of buffers each having a start address and an end address related therewith; and
   a translation circuit operationally coupled with the buffer manger interface to map the start address of each of the plurality of buffers to a first bank and to map the related end address to a second bank, different than the first bank,
   and wherein the translation circuit includes an adder that adds the start address and a burst size address to generate the end address.

2. The address translation circuit of claim 1, and wherein the buffer manager interface comprises a buffer start address bus that receives the start address and a burst size bus that receives the burst size address and wherein the buffers are accessible through a flat address space.

3. The address translation circuit of claim 2, and wherein the translation circuit further comprises a first address translator and a second address translator, and wherein when the burst size exceeds a page size and the first address translator generates a first page start address on a first page and a first page end address also on the first page, and the second address translator generates a second page start address on a second page and a second page end address also on the second page, wherein the first bank contains the first page and the second bank contains the second page.

4. The address translation circuit of claim 1, wherein the plurality of buffers occupy sequential memory locations in a flat address space and wherein the translation circuit maps the start address of adjacent buffers to different banks.

5. A circuit configured to translate an address comprising:
   a start address bus that receives a start address defined in a flat address space;
   a burst size bus that receives a burst size;
   a first page start address bus that provides a first page start address in an SDRAM address space;
   a first page end address bus that provides a first page end address in an SDRAM address space;
   a second page start address bus that provides a second page start address in an SDRAM address space;
   a second page end address bus that provides a second page end address in an SDRAM address space; and
   a translation circuit operationally coupled with the start address bus and the burst size bus to receive the start address and the burst size, and operationally coupled with the first page start address bus, the first page end address bus, the second page start address bus and the second page end address bus to provide the first page start address, the first page end address, the second page start address and the second page end address, wherein when the burst size exceeds a determined page size, the translation circuit generates the first page start address and the first page end address in a first page and generates the second page start address and the second page end address in a second page, wherein the first and second pages are in different banks, and wherein the translation circuit comprises an adder operationally coupled with the start address bus and the burst size bus and adds the burst size to the start address to generate an end address.

6. The circuit of claim 5, wherein each of the start address bus, the burst size bus, the first page start address bus, the first page end address bus, the second page start address bus and the second page end address bus are a plurality of bits wide.

7. The circuit of claim 5, and wherein the translation circuit further comprises a first page address translator operationally coupled with the start address bus to receive the start address and operationally coupled with the first page start address bus and the first page end address bus to provide the first page start address and the first page end address, wherein the first page address translator generates the first page start address and the first page end address based upon the start address.

8. The circuit of claim 7, wherein the translation circuit further comprises a second page address translator operationally coupled with the adder to receive the end address, and with the second page start address bus and the second page end address bus to provide the second page start address and the second page end address based upon the end address.

9. The circuit of claim 8, wherein the start address bus and the burst size address bus are timed based upon a first clock signal, and the first page start address bus, the first page end address bus, the second page start address bus and the second page end address bus are timed based upon a second clock signal, wherein the first and second clock signal are asynchronous and at different frequencies.

10. The circuit of claim 5, further comprising:
    a data bus that receives data;
    an SDRAM controller operationally coupled with the data bus and with the translation circuit; and
    an SDRAM operationally coupled with the SDRAM controller wherein the SDRAM controller writes data to the first page and simultaneously performs a precharge operation on the second page.

11. The circuit of claim 10, wherein the data comprises a packet of data having a size determined by the burst size and wherein the packet of data is written to sequential address locations within the first page beginning at the first page start address.

12. The circuit of claim 11, wherein when the burst size exceeds the page size, data is also written to sequential address locations within the second page beginning at the second page start address.

13. The circuit of claim 12, wherein the data bus, the start address bus and the burst size bus are timed based upon a first clock, and the SDRAM is timed based upon a second clock, and wherein the first and second clock operate asynchronously and at different frequencies.

14. The circuit of claim 10, wherein the SDRAM controller accesses data in the second page and simultaneously perform a precharge operation on a third page, and wherein the second and third pages are in different banks.

15. A circuit comprising:
    a memory having a plurality of banks, each bank having a plurality of pages, wherein a first page in a first bank may be accessed simultaneous to precharging a second page in a second bank;
    an address bus for accessing the memory, wherein the memory is divided into a plurality of buffers so that each buffer has a start address, a plurality of sequential address locations and an end address, and wherein each buffer is sized to hold a packet of data; and
    a translation circuit operationally coupled between the memory and the address bus, wherein the translation circuit maps a start address of a first buffer to the first page in the first bank, maps an end address of the first buffer to the second page in the second bank, and maps a start address of a second buffer to the second bank, and maps an end address of the second buffer to the first bank,
    and wherein the translation circuit includes an adder that adds the start address and the burst size to generate the end address.

16. The circuit of claim 15, wherein the memory comprises an SDRAM.

17. The circuit of claim 15, wherein the address bus comprises a start address bus and a burst size bus.

18. The circuit of claim 17, wherein each of the start address bus and the burst size bus comprise a plurality of bits.

19. The circuit of claim 15, and wherein the translation circuit maps a start address of a third buffer to the first bank and maps an end address of the third buffer to the second page in the second bank, whereby the end address of the first buffer and the end address of the third buffer are mapped to the same page.

20. The circuit of claim 19, and wherein the memory operates based upon a first clock signal and the address bus operates based upon a second clock signal that is asynchronous to the first clock signal.

21. The circuit of claim 20, and further comprising a data bus operationally coupled with the memory to transfer data into and out of the memory at the address locations selected over the address bus.

22. A method of operating a memory comprising the steps of:

receiving a start address and a burst size, wherein the burst size is greater than a page size;

translating the start address to a first page start address on a first page of memory;

selecting a second page start address on a second page of memory;

determining the end address based upon the start address and the burst size;

writing data to the first page of memory; and precharging the second page of memory simultaneous to the step of writing data.

23. The method of claim 22, wherein the step of receiving the start address and the burst size comprises receiving the start address defined in a first memory address space.

24. The method of claim 23, wherein the step of receiving the start address and the burst size further comprises receiving the start address defined in a flat memory address space.

25. The method of claim 24, wherein the step of translating the start address comprises translating the start address from the flat memory address space to an SDRAM address space.

26. The method of claim 22, further comprising the steps of:

receiving a second start address and a second burst size wherein the second burst size is less than the page size;

receiving a third start address and a third burst size wherein the third burst size is less than the page size;

translating the second start address and the third start address from a flat memory address space to an SDRAM address space, wherein the second and third start addresses are translated into different banks;

writing data to the translated second start address, precharging the page containing the translated third start address, simultaneous to the step of writing data to the translated second start address.

27. The circuit of claim 26, wherein step of receiving a second start address occurs based upon a first clock signal; and the step of writing data to the translated second start address occurs based upon a second clock signal, wherein the first and second clock signals are asynchronous.

* * * * *